US007943004B2

(12) United States Patent
Graziano

(10) Patent No.: US 7,943,004 B2
(45) Date of Patent: May 17, 2011

(54) METHOD TO HOLD SLIPCOVERS IN PLACE TO FURNITURE USING A HEAT ACTIVATED DOUBLE SIDED TAPE

(76) Inventor: Frank Graziano, Commack, NY (US)

( * ) Notice: Subject to any disclaimer, the term of this patent is extended or adjusted under 35 U.S.C. 154(b) by 882 days.

(21) Appl. No.: 11/906,257

(22) Filed: Oct. 1, 2007

(65) Prior Publication Data
US 2008/0066858 A1    Mar. 20, 2008

Related U.S. Application Data

(63) Continuation-in-part of application No. 11/249,975, filed on Oct. 13, 2005, now abandoned.

(51) Int. Cl.
*B29C 65/50* (2006.01)
*B29C 65/76* (2006.01)
(52) U.S. Cl. .......... 156/308.2; 156/313; 156/324.4; 156/331.7; 156/332; 156/247; 428/349; 428/354; 428/355 AC; 428/355 N
(58) Field of Classification Search .......... 156/152, 156/247, 306.6, 308.2, 313, 324.4, 331.7, 156/332, 344; 428/343, 346, 347, 349, 354, 355 AC, 355 N
See application file for complete search history.

(56) References Cited

U.S. PATENT DOCUMENTS

| | | | | |
|---|---|---|---|---|
| 4,404,243 | A | * | 9/1983 | Terpay .......... 428/62 |
| 5,494,330 | A | * | 2/1996 | Fotsch .......... 297/229 |
| 5,768,754 | A | | 6/1998 | Armstrong |
| 2003/0113533 | A1 | | 6/2003 | Husemann |

* cited by examiner

Primary Examiner — Michael A Tolin

(57) ABSTRACT

A method of securely holding any style slipcover, fabric, or other covering, in place to furniture using a specially designed, non-permanent, re-usable, heat-activated, double-sided adhesive tape placed on the furniture itself under the slipcover before slipcover installation, whereby upon subsequent heating, the slipcover will not move from its desired position after or during normal use. The slipcover can still be removed from the furniture without the need to apply additional heat to the underlying tape, and the slipcover can be re-installed and re-heated to yield secure attachment to the furniture multiple times. The tape can be removed from the furniture and discarded but will not leave a residue on the furniture.

18 Claims, 3 Drawing Sheets

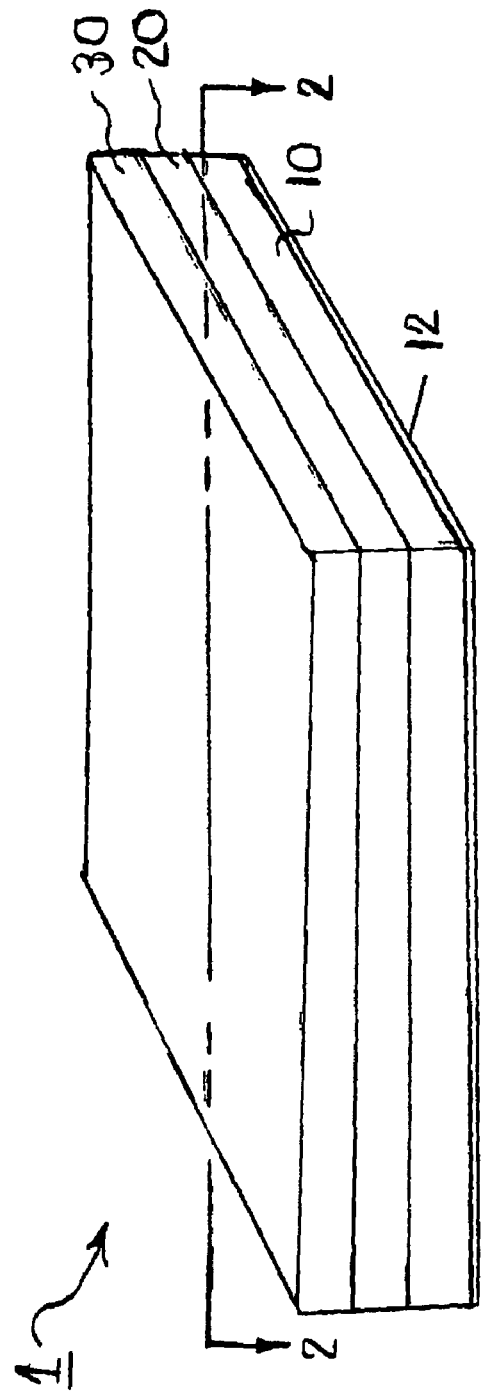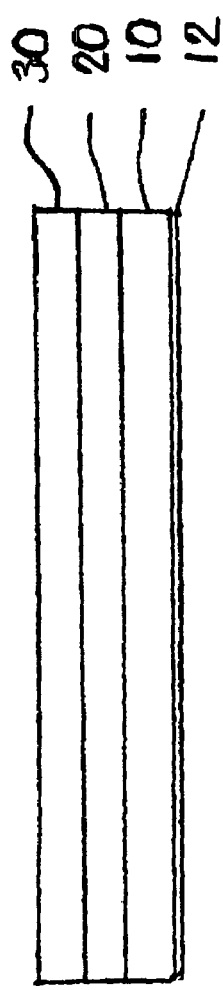

METHOD TO HOLD SLIPCOVERS IN PLACE TO FURNITURE USING A HEAT ACTIVATED DOUBLE SIDED TAPE

This application is a continuation-in-part (CIP) of prior application Ser. No. 11/249,975 filed on Oct. 13, 2005, now ABN.

FIELD OF INVENTION

This disclosure relates to a method of securely holding any style slipcover, fabric, or other covering, in place to furniture by using a specially designed, non-permanent, heat-activated, double-sided adhesive tape placed on the furniture itself under the slipcover, whereby, upon subsequent heating, the slipcover will not move from its desired position after, or during, normal use. It will not shift forward, backward, or laterally. In addition, because of the tape's special construction, it allows for easy removal of the slipcover from the underlying furniture; allows the user to remove the tape from the underlying furniture without leaving a residue; and the tape is re-useable.

This disclosure relates to Provisional Application 60/619,998 which was filed on Oct. 19, 2004, and claims priority therefrom.

BACKGROUND

Consumers may desire a change in their home furniture, and there are several options. New furniture can be purchased, existing furniture can be re-upholstered, or a slipcover custom-made or ready-made can be ordered. Those who choose the slipcover option do so for numerous reasons; to occasionally change the fabric/look of their furniture; to launder the slipcover fabric if ever need be; and it is generally the least expensive of the options.

Custom slipcovers are made to fit a specific piece of furniture. It is made directly on the furniture itself and therefore should have the best fit, and all cushions are individually covered. Semi-custom slipcovers are made by using measurements of a particular piece of furniture and the cushions may or may not be covered separately. Finally, the ready-made slipcover can be bought at a store where one size fits all within each category of sofa, loveseat, or chair. They are generally made as one piece of fabric that covers the entire piece of furniture, although the cushions may or may not be covered separately. They are the least fitted of them all. For the purpose of this application, we are only concerned with two definitions of a slipcover. That is, slipcovers with separately covered cushions or slipcovers that do not have separately covered cushions.

Movement has been a problem with any slipcover, custom, semi-custom, or ready-made. Under normal use, slipcovers typically shift out of place in many directions. Ready-made slipcovers will begin to shift almost immediately when in use. The reason for this is because there is virtually nothing holding the slipcover to the furniture. As the slipcovered furniture absorbs our body weight from use, it will predictably shift out of place.

The Riley U.S. Pat. No. 5,722,723, issued on Mar. 3, 1998, discloses a device essentially made of bendable rubber that when inserted into the back crevices of a piece of furniture, behind or to the sides of the seat cushions, yet on top of the slipcover, is meant to hold the slipcover in place. Although this device does, to some extent, do what it is designed to do, it falls short of its main purpose—securing a slipcover to the underlying furniture. In reality, after careful read of the aforementioned Riley patent, the device disclosed therein is only meant to stabilize, not securely hold, the slipcover in place.

In addition, the Riley device is designed to be inserted on top of a slipcover, and in only the crevices of the furniture; such as the crevice of the inside arm, and the crevice under the seat cushion where the slipcover is not seen. However, this device will not prevent the slipcover from movement or shifting caused by the weight of an individual sitting or lying on the slip covered furniture. As a result, unless the slipcover can be secured from forward, backward, and lateral movement, the slipcover will continue to move, wrinkle, and shift around into an unsightly appearance, and will require maintenance on the part of the slipcover owner to re-tuck and adjust the slipcover after normal use.

Unlike the Riley device, the double-sided adhesive tape of this disclosure is designed to be used directly on the furniture itself, under the slipcover and outside the crevices, although it can be placed inside or partially inside the crevices as well. For example, placing the tape along the outside arm of a piece of furniture as well as along the corresponding inside arm of the furniture creates "tension" necessary to keep the slipcover in that area from shifting while in use. The tension formed by the double-sided tape keeps the fabric taunt, which is recommended in order to hold the slipcover in place as compared to the use of any device which may be placed only in the crevice of the furniture to anchor the slipcover to the furniture. This is because as we sit on furniture, our body weight tends to pull the slipcover down with us, thereby shifting the fabric out of place. To prevent this, anchorage is mostly needed on both the inside and outside of the furniture.

The use of Velcro has found its way not only into slipcovers but throughout our society. However, Velcro needs two separate strips to function. When used with slipcovers it is necessary to calculate the exact location on the furniture, as well as the corresponding location on the slipcover, for the two side to meet and stay perfectly aligned throughout the entire length of the Velcro strips. Installing the slipcover would be difficult as the opposing Velcro strips would be sticking to each other like fly paper along numerous locations during the entire slipcover installation, making it difficult or impossible to get the slipcover into its proper position. Also, Velcro would be too thick and bulky under the slipcover, making it conspicuous and unsightly.

Conversely, the tape of this disclosure functions alone and does not require calculating any locations on the slipcover or furniture. It is thin enough to be virtually undetectable under the slipcover. The heat activated side of the tape is not sticky until heated so it is dry to the touch, allowing for smooth and effortless slipcover installation.

There are numerous double sided tapes on the market that possess many structural combinations of adhesives and substrates. However there is no single tape that possesses the same structural components as the tape of this disclosure that can also yield the stated results. For example, the Husemann application #20030113533 is a double sided tape in an unrelated field for an unrelated purpose that may seem to parallel the tape of this disclosure, but in reality it differs. The structure of its tape uses a cross linked polyurethane carrier as its substrate. In essence this is a film made of polyurethane that is attached chemically to its opposing adhesives.

In contrast, the tape of this disclosure uses a fiberglass cloth for a substrate. Its opposing adhesives are physically laminated to it, as opposed to chemically. Also, the tape of this disclosure uses a thermoplastic heat activated adhesive which has the ability to be reheated multiple times to yield secure attachment to surfaces. Together with the fiberglass cloth, as well adhesives used, the tape becomes uniquely non-permanent in nature, reusable, and removable without leaving a residue.

There are various other patents or devices describing spring-loaded or metal strip devices and such, yet they not only have limited actual holding power but are mostly designed for placement on top of or only in the crevices of slip-covered furniture, or are designed to be permanently sewn or attached to the slipcover itself like ties and elastic. The need to find a way to secure slipcovers to furniture is such that some have resorted to using twist pins inserted on top of and throughout the slipcover.

The heat-activated double-sided tape of this disclosure may form the strength of attachment similar to permanently fastening a piece of fabric along furniture arms, for example, by first stapling the inside arm to the frame of the furniture and pulling the other end of the fabric over and down the outside of the arm, thereby creating the necessary tension. The double-sided tape of this disclosure is a non-permanent means of performing a similar function by first applying the tape directly to the furniture, in generally specific locations, before installing the slipcover and then applying heat directly to the surface of the slipcover, allowing the heat to penetrate through, thereby activating the heat activated adhesive side of the tape to hold and shape the slipcover to the contour of the underlying furniture.

In addition, the tape is manufactured to allow the slipcover to be removed at any time as may be desired. The strength of the tape can withstand relative vigorous stress, and yet the slipcover can still be removed with minimal effort and without having to reheat the tape. Also, the tape will allow for the removed slipcover to be re-installed, re-heated, and yet still securely hold the slipcover in place again and again. The tape itself can be removed from the underlying furniture and probably discarded but without leaving a residue on the furniture.

This double-sided tape may be employed with slipcovers that have separately covered cushions where the furniture cushions are removed from the body of the furniture before the installation, thereby allowing total access to all parts of the furniture. The inside furniture arms and the inside back of the furniture may be easily secured with the application of heat with the tape while the seat cushions are temporarily removed.

The tape may also work with slipcovers that do not have separately covered cushions, and other fabric or coverings as well, by applying the tape to the furniture according to the construction of the slipcover and typically employing the tape in a number of locations.

SUMMARY

This disclosure relates to a method of securely holding any style slipcover, fabric, or other covering in place on furniture by using a uniquely designed, double sided, heat-activated tape. The double-sided tape securely holds the slipcover in place by placing the tape in generally specific locations on the surface of the furniture upholstery where it can come into contact with the underneath surface of a slipcover. Heat is applied directly to the surface of the slipcover, penetrating through it and activating the heat activated adhesive side of the tape to hold and shape the slipcover to the contour of the underlying furniture. Based on construction of the tape, the slipcover can be easily removed from the furniture, leaving the tape itself still attached to the furniture where it can be re-used multiple times. The tape can also be removed from the underlying furniture without leaving a residue.

DRAWINGS

FIG. 1 is perspective view of the layers of the double-side tape.

FIG. 2 is a cross-sectional view of the double-sided tape depicting the distinct layers.

DETAILED DESCRIPTION

Figure 3:
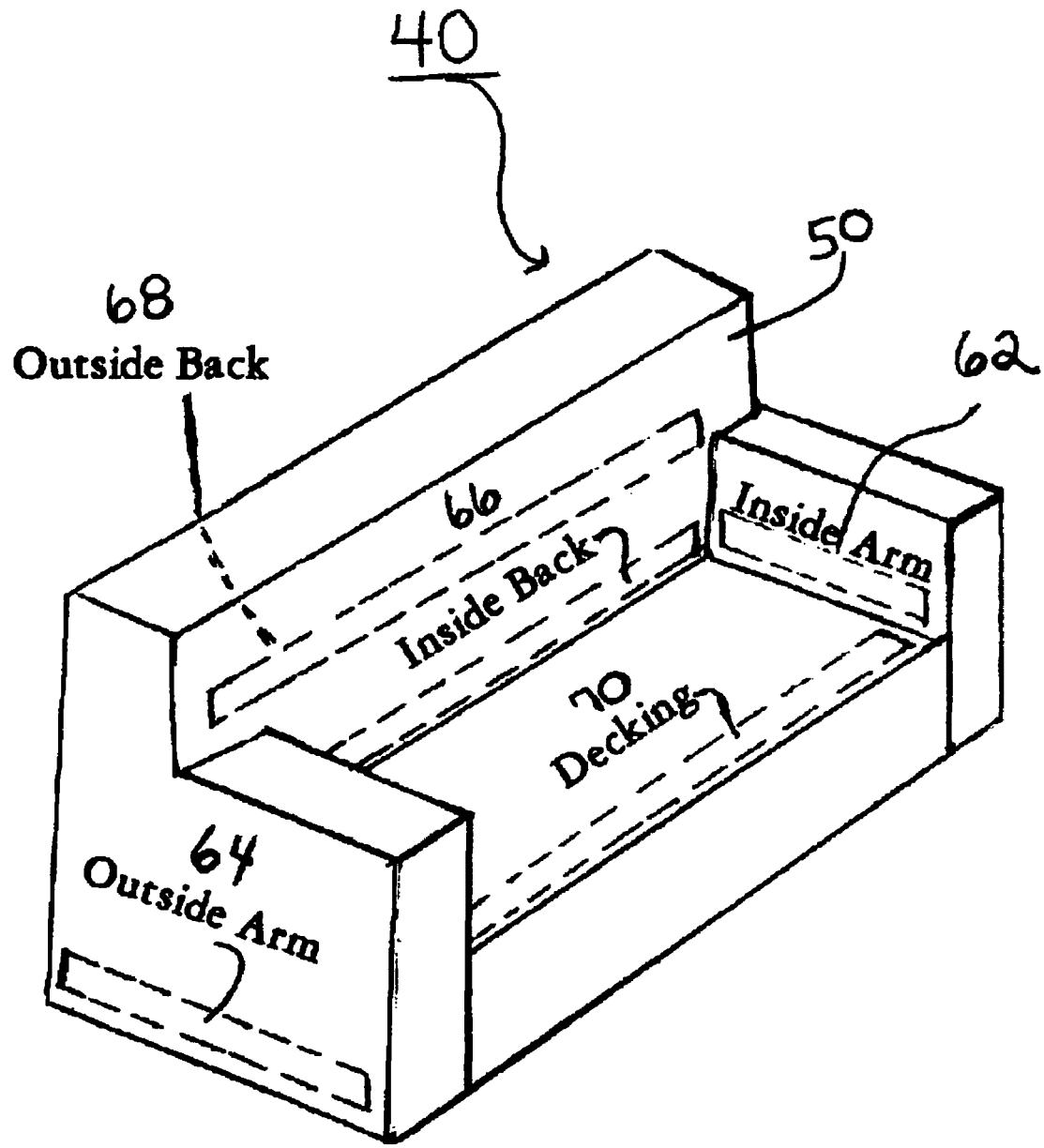
FIG. 3 is perspective view of an embodiment of the double-sided tape in use with furniture.

As shown in FIG. 1 and FIG. 2, the removable and reusable double-sided adhesive tape 1 includes a substrate 20 formed of fiberglass cloth or any material which may provide strength, flexibility, and will not melt, shrink, or change in size or composition when exposed to heat of varying temperatures that are possible from an iron or steamer (hereinafter referred to as "iron"), such as, for example, cotton, cotton blends, synthetic materials, such as polyesters and the like. In one preferred embodiment, the substrate 20 can be formed of a woven caramelized fiberglass cloth 20 which is thin and flexible enough to be comfortable and virtually undetectable under the slipcover while the furniture is in use. In addition, the fiberglass cloth tends to deflect heat and therefore cool quickly allowing the slipcover to be ready for use shortly after heating the tape. The substrate 20 may typically have a thickness of approximately 2.5 millimeters to 4.5 millimeters.

One side of the substrate 20 may be coated with at least one aggressive, heat resistant, pressure-sensitive adhesive (PSA) 10. It is recommended to use an acrylic that will resist melting or degrading at elevated temperatures that can be reasonably caused by an iron but at the same time have the consistency to adhere well to textiles. In one preferred embodiment, the PSA 10 can be formed of the acrylic adhesive S8510 manufactured by Avery-Dennison of Pasadena Calif. based on its heat resistance, cohesive strength, cost effectiveness, and excellent anchorage quality to textiles, as well as to various substrates and surfaces. It will resist degrading at generally high temperatures and also may have a coating thickness of approximately 2.5 to 3.5 millimeters, with the typical amount being approximately 3.0 millimeters. In addition, certain acrylic adhesives are resistant to high temperatures therefore will hold its form under heat from an iron, allowing the tape 1 to be removable from the furniture, and typically does not leave a residue on the contact surface after removal.

The PSA 10 can be temporarily covered with removable release paper 12 to prevent or lower the incidence of entanglement or sticking in unwanted locations on the furniture, the slipcover, or the user.

The opposite side of the substrate 20 may be coated with at least one low temperature reactive, heat-activated adhesive 30 which will come in contact with the underside of the slipcover, and, when exposed to heat, secures the slipcover to the tape 1. In one preferred embodiment, the heat-activated adhesive 30, such as the adhesive GMS 269, a vinyl acetate maleate manufactured by Cytec Surface Specialties of Massachusetts, is a solvent based thermoplastic that may have a thickness of approximately 1.5 to 3.0 millimeters, with the typical amount of approximately 2.0 millimeters. The heat-activated adhesive 30 is a low temperature reactive thermoplastic adhesive, meaning it will begin to melt or soften, therefore adheres, at a comparably low temperature. This temperature is determined based on a number of factors such as temperature, pressure, and surfaces being adhered to. However this particular adhesive has a glass transition temperature of approximately 30 degrees Celsius.

The nature of thermoplastic adhesives is such that it has the ability to be reheated multiple times and still have holding power. In one embodiment, the heat-activated adhesive 30 can be a urethane, vinyl acetate, or another adhesive having similar characteristics.

Although there is no maximum limit to the length or width the tape 1 may be, the preferred width of the tape 1 may be formed to be approximately 2.0 "to 3" for great strength per square inch.

Operation

FIG. 3 is a perspective view of an article of furniture, having the seat and back cushions removed, to show the general locations to place the tape 1 for installation of a slipcover 50 with separately covered cushions. The tape 1 can be applied directly to the existing furniture 40 in areas shown before the slipcover 50 is installed. The release liner 12 can be removed, and the tape 1 can be applied using the pressure-sensitive side 10 in contact with and adhering to the existing furniture 40. The heat-activated side 30 would be the outer face of the tape 1 to contact the underside of the slipcover 50 when it is placed on the furniture 40. The tape 1 is applied at least to locations of the furniture 40, such as, for example, the inside arms 62, the outside arms 64, the inside back 66, the outside back 68, and along the bottom decking's front edge 70 under the seat cushions. The tape 1 may be applied to numerous other locations depending on the style of furniture 40. For best results, the tape 1 should be applied to the entire length of each section of the furniture 40.

Figure 4:
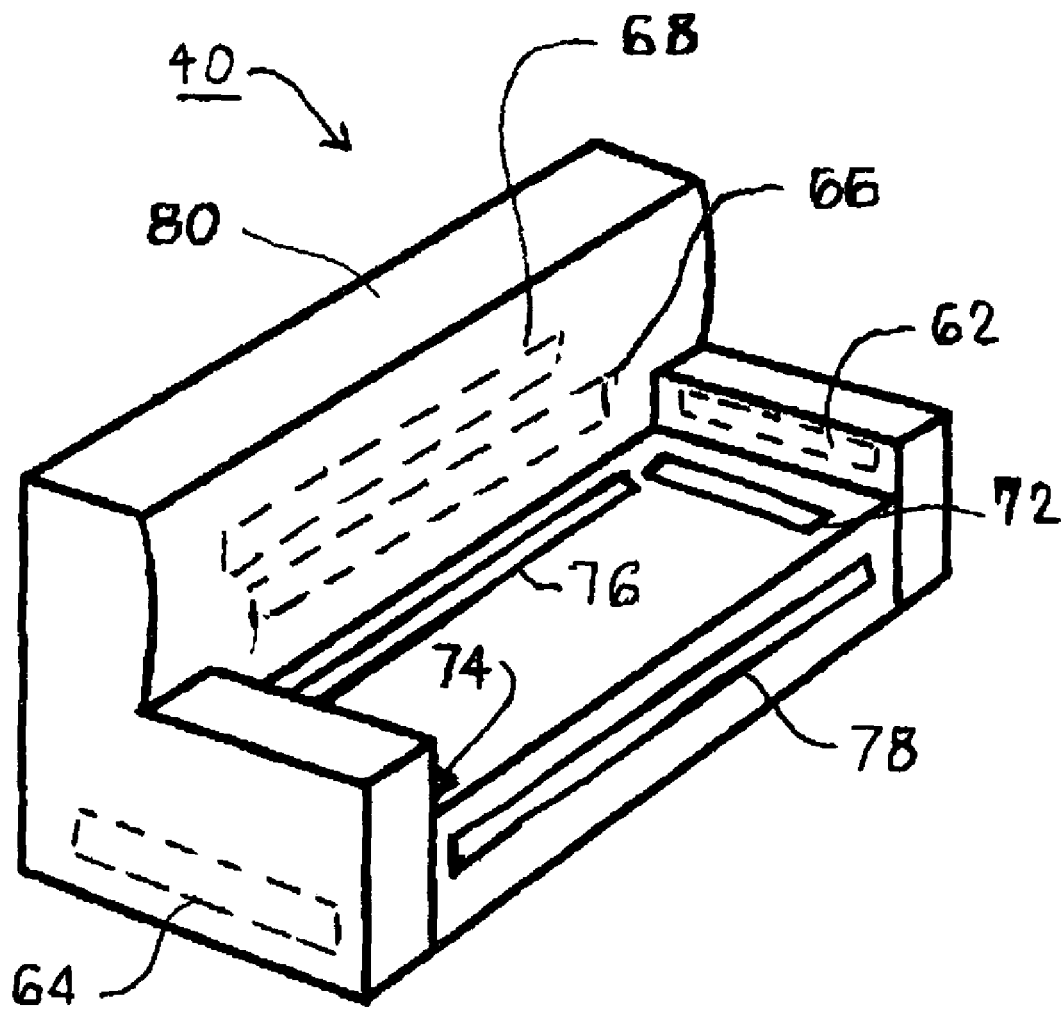
FIG. 4 is perspective view of a second embodiment of the double-sided tape in use with furniture.

FIG. 4 is a perspective view of an article of furniture having the seat cushions in their typical location for installation of a slipcover 80 without separately covered seat cushions, and showing the general locations to place the double-sided tape 1 on to the furniture 40. In addition to placing the tape 1 in locations of the inside arms 62, the outside arms 64, the inside back 66, and the outside back 68, the tape 1 may also be placed on the top surface of the cushioned area along the side 72, side 74, and far back 76. The tape 1 may also be placed along the front of the body of the furniture 40 just below the level of the seat cushions as indicated at position 78. For best results, the tape 1 should be applied to the entire length of each section of the furniture 40.

Referring to FIG. 3, after the tape 1 is applied to the furniture 40, the slipcover 50 is installed and adjusted to its proper position. Once the slipcover 50 is installed, a heat source such as an iron may be applied to the face of the slipcover 50 over and along the locations of the tape 1. Heat can penetrate through the slipcover 50 and quickly activate the low temperature reactive, heat-activated adhesive 30 and cause the underside of the slipcover 50 to adhere to the tape 1. The length of heat application will vary according to the slipcover materials and their thicknesses. Thinner materials require less heating time to adhere, while thicker materials require more heating time.

In addition, the heat-activated adhesive 30 is a low temperature reactive adhesive, meaning it will begin to melt, therefore adheres, at a comparably low temperature. This is desirable for this application because it will expedite the time it takes to heat the tape 1 to the point where the slipcover 50 can begin to adhere to the tape 1.

As stated earlier the length of heat application will vary according to the slipcover materials and their thicknesses, however, a general guideline to use to determine the proper amount of heat needed to activate the heat activated adhesive 30, to hold the slipcover 50 in place, is to place your hand directly onto the area of slipcover 50 just heated. It should feel hot. If it feels only warm, not enough heat was used therefore increase the heating time or iron temperature. If it is too hot to touch, too much heat is being applied therefore decrease the heating time or iron temperature. Following this guideline will help avoid overheating the tape, which may make slipcover 50 removal difficult, or under heating the tape 1, creating a weak bond between the slipcover 50 and the furniture 40.

Referring to FIG. 3, the preferred order of heating the tape 1 for a slipcover 50 along each section of the furniture 40 is as follows: first heat outside back 68, and outside arms 64. With outside sections now secured heat inside back 66, and inside arms 62. As these sections are heated it is preferred, but not required, to gently pull the slipcover 50 down some thereby creating the tension necessary between the inside sections of the furniture 40 and it's corresponding, previously heated, outside sections. Next heat the decking 70 area. This will prevent the front of the slipcover 50 from dropping to the floor or rising up out of position during use. Finally heat any other areas of the furniture 40 where tape 1 may have been applied.

Referring to FIG. 4, the preferred order of heating the tape 1 for a slipcover 50 without separately covered cushions, along each section of the furniture 40, is the same as above including these additional locations: After outside back 68, outside arms 64, inside back 66, and inside arms 62 are heated, proceed with side 72, side 74, far back 76, and front area position 78.

The tape forms a strong yet non permanent bond between the slipcover and the furniture thereby providing comfortable and securely fastened slipcovers.

The slipcover can be removed from the furniture without the need to re-apply heat simply by manually lifting or peeling the slipcover from the furniture, leaving the tape still applied to the furniture to be used again. This is made possible by not only following the proper heating technique discussed earlier but also through the use of proper quantities of adhesives, which is discussed in further detail in the following section.

Advantages

From the description above we can detail the features of this disclosure that work in conjunction with each other to yield unique and superior advantages over all prior art, as well as for the end user. These features are as follows:

Non-Permanent

The type of PSA used in this disclosure is an acrylic having an aggressive tack to textiles, and will resist melting or degrading at elevated temperatures. For the purpose of this application we refer to high temperatures as being typical temperatures produced by an iron set at its highest settings, with medium pressure and time. Under these conditions the PSA is generally exposed to varying temperatures of up to approximately 250 degrees Fahrenheit. As a result, the adhesive should not leave a residue on the furniture if the tape is removed from the furniture. This lack of residue is desirable for this application because for the tape to be non-permanent it should be able to be removed from the furniture, and not leave a residue. In addition, to be considered non permanent the slipcover itself should have the ability to be removed from the furniture.

The heat-activated adhesive used is a thermoplastic and by its very nature can be heated, allowed to cool, and be re-heated to adhere multiple times. This ability to remove the slipcover, re-install it over the tape covered furniture, and re-heat the tape suggests it being non permanent, if the proper amounts of adhesive and proper heating technique are used for this application. The adhesive, once heated, begins to hold the slipcover in place by melting and therefore seeping just enough into the fibers of the underside of the slipcover to grab hold and secure the slipcover to the tape. As a result, the amount of adhesive used is important because too much adhesive, when heated, may tend to seep too deeply into the fibers of the underside of the slipcover fabric surface whereby possibly making it difficult or impossible to remove the slipcover from the underlying tape covered furniture. Conversely, too little amount of adhesive used will tend not to envelope enough fibers of the underside of the slipcover surface to facilitate its holding strength.

The substrate used should be one that will not melt, shrink, or change in size or composition when exposed to heat of varying temperatures that can be generated from an iron. Many substrates considered to be a film, for example, would not be appropriate for this application because it will tend to de-stabilize and melt into the surrounding fabrics making the slipcover to the furniture a more permanent bond, or leaving a sticky residue, negating its non-permanent feature. The substrate used in this disclosure is a fiberglass cloth, but other cloths may be used as long as they keep their form under high temperatures, thereby keeping the adhesives on the tape separate and intact. In addition, it is preferred that the thickness of the substrate be comparably thin enough to be virtually undetectable to a person sitting on the furniture. Tapes with too thick a substrate will tend to look like bulky lumps that can be seen or felt from under the slipcover and would not be appropriate for this application.

Holding Strength

Measured amounts of heat-activated adhesive contribute to the tapes holding ability for this application. As mentioned above, too much adhesive may create too strong a bond, possibly making it difficult or impossible for the slipcover to be removed from the furniture, too little may diminish its holding strength.

The measured amount of PSA used is also important to its holding strength because if not enough adhesive is used, the tape itself will not exhibit enough tack to stay fastened to the furniture when exposed to the stresses caused by body weight from using the furniture.

The width of the tape is calculated as such to work in conjunction with the amount of adhesives used to maintain the tape's cohesive strength on both sides of the substrate. In effect, the more furniture area covered by the tape, the less adhesive strength is required per square inch. Therefore, the wider the tape, the less amounts of adhesives are needed to create a strong, yet non-permanent bond. Tape that is too small in width would require excessive amounts of adhesives in an attempt to maintain its holding strength. Using too much of this adhesive will generally make the tape overly susceptible to being overheated by the user's iron, thereby making the slipcover difficult or impossible to remove, and would therefore negate the tape's non-permanent feature.

Re-Usability

For this application, re-usability refers to the ability to remove the slipcover from the underlying, tape covered furniture after the heat-activated adhesive side of the tape has been heated, and allowed to cool, with the ability to be repeatedly reheated to the point of adhesion at least two times. The slipcover can be removed by physically lifting or peeling it off the tape covered furniture in normal fashion. There is no need to reheat the tape in order to remove the slipcover from the furniture. In addition, the tape can remain on the furniture while the slipcover, for example, is being washed or replaced. The slipcover can then be re-installed onto the furniture and re-heated again to yield secure attachment. This process can be repeated multiple times, at least 2 times, before enough fibers from the underside of the slipcover material accumulate within the heat-activated adhesive itself to diminish its effectiveness. Generally, slipcover fabrics with a loose weave and irregular underside can typically be re-heated at least three times before losing effectiveness, where fabrics with a tight weave and a smooth underside can be re-heated five or six times or more. The ability to re-use the tape in this way is a result of the following:

(a) The use of a thermoplastic adhesive allows for the tape to be re-heated multiple times thereby being re-usable.

(b) The heat-activated adhesive side of the tape is re-usable when the quantity of adhesive used is calculated to allow the slipcover to be removed from the tape covered furniture, yet still possess adequate holding strength. Once again, the application of too little adhesive may not grab enough of the fibers of the underside of the slipcover fabric, thereby diminishing its holding capacity. The application of too much adhesive may, once exposed to heat from an iron, tend to seep too deeply into the fibers of the underside of the fabric making removal of the slipcover possibly difficult.

(c) The quantity of heat activated adhesive used in relationship with the quantity of PSA used also contributes to the tape's re-usability. The tape should contain equal or greater amounts of PSA, compared to the amount of heat activated adhesive used because of the greater propensity of the heat activated adhesive to adhere to the underside of the slipcover fabric, than the PSA has to adhere to the furniture. The tape can remain on the furniture during slipcover removal because of the stronger bond of the PSA. This relationship between adhesive quantities is important for this application because in order for the tape to be re-used it needs the ability to stay on the furniture during slipcover removal. This is accomplished in part by giving the PSA, through quantity applied, enough tack to hold to the furniture during slipcover removal.

(d) The method used to apply tape to the furniture also contributes to the tape's re-usability because as stated earlier it is recommended to apply tape to the entire length of each section of the furniture. Doing so will prevent the ends of the tape from being exposed to possible excessive heat from the iron. It is the very ends of the tape that may begin to come up off the furniture during slipcover removal if excessive heat is applied, although it is unclear exactly why this is so. To avoid this, keeping the ends of the tape generally away from the heat of the iron will allow the tape to stay on the furniture when the slipcover is removed, thereby contributes to making the tape re-usable.

Another advantage of this double-sided adhesive tape is its use of a heat-activated adhesive that is not tacky at ambient temperature. This feature allows the slipcover to slide over the tape with ease during installation.

The double-sided adhesive tape of this disclosure is advantageous over other combination tapes. For example, currently known double-sided tapes often include PSA on both sides of the substrate which if used with this application can interfere with the slipcover installation, since the outside of the tape would have an exposed tacky adhesive. The slipcover would be stuck at any point of contact with the tape throughout the installation, thereby making the installation of the slipcover time consuming, difficult, and frustrating, especially with snug fitting custom slipcovers. In addition, the tape will dislodge in certain spots, and/or accumulate fibers and the like, from movement of the slipcover over and onto the tape during installation of the slipcover. As a result, adhesion would be severely diminished, with re-usability virtually non-existent.

Another possible combination tape may be a double-sided tape with heat-activated adhesive on both sides of the substrate, with a small amount of PSA coated on top of one side of the tape. It is this side that would be applied to the furniture itself. The small amount of PSA would be used to help stabilize the tape in place before slipcover installation. However, due to the abrasiveness of a slipcover installation on the underlying furniture, the tape constructed in this manner would move, buckle, and fold before proper installation could be completed. In addition, heat-activated adhesive used directly on the face of underlying furniture can damage the existing furniture material and negate its non-permanent, re-usable features.

There is an alternative method of application that is possible, although not as desirable. Instead of placing the PSA side of the tape down onto the furniture, it can be placed directly onto the underside of the slipcover. As the slipcover is installed, the heat activated adhesive side of the tape would now be in direct contact with the furniture itself. Heating of the tape would be the same as in the preferred method, and adhesion would most likely be the same as well. However, as stated earlier, heat activated adhesive is a more aggressive adhesive because it is designed to melt and flow into the fibers of the underside of the slipcover fabric. In this case, the adhesive would instead flow into the fibers of the furniture fabric itself. When removing the slipcover, along with the attaching tape, it may damage the furniture fabric. In addition, the slipcover itself could not be washed or dry cleaned because the tape itself would be destroyed or damaged.

In conclusion, there exists balance and harmony between the types of adhesives used, the amount of adhesives used, the width of the tape, the thickness of the tape, the type of substrate used, as well as the method used to apply and heat the tape. This method of application, with its uniquely designed double-sided adhesive tape, will provide the user with the ability to transform a messy, disheveled looking slipcover into one with a neat appearance that will stay that way even after normal use. Yet the slipcover is still removable, a feature most slipcover owners require. Also, the slipcover can be removed without having to apply heat. The slipcover can then be reinstalled, and re-heated multiple times using the same double-sided adhesive tape of this disclosure, to once again grip the furniture. The double-sided adhesive tape can also be removed from the underlying furniture, if so desired, and it will not leave a sticky residue.

Although illustrative embodiments of the present disclosure have been described herein with reference to the accompanying drawings, it is to be understood that the invention is not limited to those precise embodiments, and that various other changes and modifications may be effected therein by one skilled in the art without departing from the scope or spirit of the invention.

What is claimed:

1. A method of securely attaching a slipcover to an article of furniture, the slipcover having an underside and an opposed topside, the method comprising:
    providing a double sided adhesive tape, the double sided adhesive tape comprising at least one pressure sensitive adhesive, at least one heat activated adhesive, and a flexible substrate,
    providing said double sided adhesive tape between said article of furniture and said underside of said slipcover at one or more locations, such that said double sided adhesive tape makes contact with said article of furniture and said underside of said slipcover,
    installing said slipcover on to said furniture,
    and applying heat to said topside of said slipcover on top of where said double sided adhesive tape lies between said article of furniture and said underside of said slipcover, wherein the applied heat causes said slipcover to adhere to said article of furniture.

2. The method of claim 1, wherein said step of providing said double sided adhesive tape between said article of furniture and said underside of said slipcover at one or more locations comprises:
    providing said double sided adhesive tape between said underside of said slipcover and said article of furniture at least along inside and outside arms of said article of furniture,
    providing said double sided adhesive tape between said underside of said slipcover and said article of furniture at least along inside and outside backs of said article of furniture,
    providing said double sided adhesive tape between said underside of said slipcover and said article of furniture at least along decking of said article of furniture,
    wherein said slipcover is designed for use with separate cushions.

3. The method of claim 2, wherein the step of applying heat is performed at least along said inside and outside arms of said article of furniture with said slipcover installed thereon, at least along said inside and outside backs of said article of furniture with said slipcover installed thereon, and at least along said decking of said article of furniture with said slipcover installed thereon.

4. The method of claim 1 wherein said step of providing said double sided adhesive tape between said article of furniture and said underside of said slipcover at one or more locations comprises:
    providing said double sided adhesive tape between said underside of said slipcover and said article of furniture at least along inside and outside arms of said article of furniture,
    providing said double sided adhesive tape between said underside of said slipcover and said article of furniture at least along inside and outside backs of said article of furniture,
    providing said double sided adhesive tape between said underside of said slipcover and said article of furniture at least along a top surface of a cushioned area of said article of furniture,
    providing said double sided adhesive tape between said underside of said slipcover and said article of furniture at least along a front of said article of furniture,
    wherein said slipcover is designed for use without separate cushions.

5. The method of claim 4, wherein the step of applying heat is performed at least along said inside and outside arms of said article of furniture with said slipcover installed thereon, at least along said inside and outside backs of said article of furniture with said slipcover installed thereon, at least along said top surface of a cushioned area of said article of furniture with said slipcover installed thereon, and at least along said front of said article of furniture with said slipcover installed thereon.

6. The method of claim 1, wherein said at least one heat activated adhesive is a thermoplastic.

7. The method of claim 6, wherein said thermoplastic is selected from the group consisting of urethane, ethylene vinyl acetate (EVA), and vinyl acetate.

8. The method of claim 1, wherein said flexible substrate is selected from the group consisting of fiberglass cloth, cotton, cotton blends, polyesters, and combinations thereof.

9. The method of claim 1, wherein said at least one pressure sensitive adhesive is an acrylic adhesive.

10. A method of securely attaching a slipcover to an article of furniture, the slipcover having an underside and an opposed topside, the method comprising:
   providing a double sided adhesive tape, the double sided adhesive tape comprising at least one pressure sensitive adhesive, at least one heat activated adhesive, and a flexible substrate, wherein the double sided adhesive tape is non-permanent and reusable, and wherein the flexible substrate is made of fabric cloth,
   providing said double sided adhesive tape between said article of furniture and said underside of said slipcover at one or more locations, such that said double sided adhesive tape makes contact with said article of furniture and said underside of said slipcover,
   installing said slipcover on to said furniture,
   and applying heat to said topside of said slipcover on top of where said double sided adhesive tape lies between said article of furniture and said underside of said slipcover, wherein the applied heat causes said slipcover to adhere to said article of furniture.

11. The method of claim 10, wherein said step of providing said double sided adhesive tape between said article of furniture and said underside of said slipcover at one or more locations comprises:
   providing said double sided adhesive tape between said underside of said slipcover and said article of furniture at least along inside and outside arms of said article of furniture,
   providing said double sided adhesive tape between said underside of said slipcover and said article of furniture at least along inside and outside arms of said article of furniture,
   providing said double sided adhesive tape between said underside of said slipcover and said article of furniture at least along decking of said article of furniture,
   wherein said slipcover is designed for use with separate cushions.

12. The method of claim 11, wherein the step of applying heat is performed at least along said inside and outside arms of said article of furniture with said slipcover installed thereon, at least along said inside and outside backs of said article of furniture with said slipcover installed thereon, and at least along said decking of said article of furniture with said slipcover installed thereon.

13. The method of claim 10, wherein said step of providing said double sided adhesive tape between said article of furniture and said underside of said slipcover at one or more locations comprises:
   providing said double sided adhesive tape between said underside of said slipcover and said article of furniture at least along inside and outside backs of said article of furniture,
   providing said double sided adhesive tape between said underside of said slipcover and said article of furniture at least along inside and outside backs of said article of furniture,
   providing said double sided adhesive tape between said underside of said slipcover and said article of furniture at least along a top surface of a cushioned area of said article of furniture,
   providing said double sided adhesive tape between said underside of said slipcover and said article of furniture at least along a front of said article of furniture,
   wherein said slipcover is designed for use without separate cushions.

14. The method of claim 13, wherein the step of applying heat is performed at least along said inside and outside arms of said article of furniture with said slipcover installed thereon, at least along said inside and outside backs of said article of furniture with said slipcover installed thereon, at least along said top surface of a cushioned area of said article of furniture with said slipcover installed thereon, and at least along said front of said article of furniture with said slipcover installed thereon.

15. The method of claim 10, wherein said at least one heat activated adhesive is a thermoplastic.

16. The method of claim 15, wherein said thermoplastic is selected from the group consisting of urethane, ethylene vinyl acetate (EVA), and vinyl acetate.

17. The method of claim 10, wherein said fabric cloth is made from a material selected from the group consisting of fiberglass cloth, cotton, cotton blends, polyesters, and combinations thereof.

18. The method of claim 10, wherein said at least one pressure sensitive adhesive is an acrylic adhesive.

* * * * *